United States Patent [19]
Landow

[11] 4,076,134
[45] Feb. 28, 1978

[54] WHEELED RAMP LOADING AND UNLOADING APPARATUS

[75] Inventor: Herbert T. Landow, North Tarrytown, N.Y.

[73] Assignee: Landow Consulting Associates, Inc., North Tarrytown, N.Y.

[21] Appl. No.: 559,714

[22] Filed: Mar. 19, 1975

[51] Int. Cl.² .................. B65G 67/00; B65J 1/10; E01D 15/12; E04G 3/16

[52] U.S. Cl. ........................... 214/38 B; 14/69.5; 105/368 B; 182/131

[58] Field of Search ............... 14/71, 72 R, 72 W; 104/137, 271, 272; 105/368 R, 368 B, 159; 182/62.5, 131; 214/1 B, 1 N, 14, 16.1 EA, 38 R, 38 D, 38 A, 151, 152, 670, 506, 38 B; 238/10 R, 12; 296/1 A; 404/1

[56] References Cited

U.S. PATENT DOCUMENTS

| | | | |
|---|---|---|---|
| 2,099,288 | 11/1937 | Allen | 105/368 B |
| 2,190,708 | 2/1940 | Fowler | 105/368 R X |
| 2,449,829 | 9/1948 | Agren | 14/72 W |
| 2,786,590 | 3/1957 | Edwards et al. | 214/506 |
| 2,963,986 | 12/1960 | Dobson | 105/159 X |
| 2,996,206 | 8/1961 | McKee | 214/670 |
| 3,019,917 | 2/1962 | Ajero | 105/368 B |
| 3,074,569 | 1/1963 | Ajero | 14/72 R X |
| 3,095,591 | 7/1963 | Buck | 14/72 W |
| 3,149,583 | 9/1964 | Morrill | 105/368 R |
| 3,370,311 | 2/1968 | Demos | 14/72 R |
| 3,576,167 | 4/1971 | Macomber | 105/368 B |

FOREIGN PATENT DOCUMENTS

| | | | |
|---|---|---|---|
| 1,082,023 | 6/1954 | France | 105/368 R |
| 901,275 | 7/1962 | United Kingdom | 105/368 R |
| 710,863 | 6/1954 | United Kingdom | 14/71 |
| 1,190,963 | 5/1970 | United Kingdom | 105/368 B |

Primary Examiner—Albert J. Makay
Assistant Examiner—Howard Beltran
Attorney, Agent, or Firm—Curtis, Morris & Safford

[57] ABSTRACT

Trailers are loaded on and unloaded from railroad flatcars by use of a system including tractors to pull the trailers, an end ramp at the end of the train, and a movable side ramp structure at the side of the train. The movable ramp structure has a ramp and a retractable bridge extending from the top of the ramp to the top of a flatcar in the train. In unloading, a tractor drives up the movable ramp and across the bridge to get onto the flatcar. Then the bridge is retracted, the tractor hitches onto one of the trailers, and pulls it along the joined beds of the flatcars and down the end ramp. The tractor then takes the trailer to a storage area, unhitches the trailer, and returns to the movable ramp structure to repeat the process. While the first tractor is pulling the trailer along the tops of the flatcars, the movable ramp structure moves to a position near the next trailer to be unloaded, and extends the bridge again. A second tractor then mounts the movable ramp and repeats the unloading process with the next trailer. Additional tractors can be used in the same way. This greatly speeds the unloading process, since the next tractor need not wait to go to work until the previous trailer has been unloaded. The loading operation is substantially the reverse of the unloading operation. The bridge of the ramp structure preferably includes power-operated telescoping arms and hinged plates forming a roadway. The arms can be positioned in four different arrangements to form roadways extending in four different directions, thus enabling the loading and unloading of tractors in any of the four directions.

14 Claims, 8 Drawing Figures

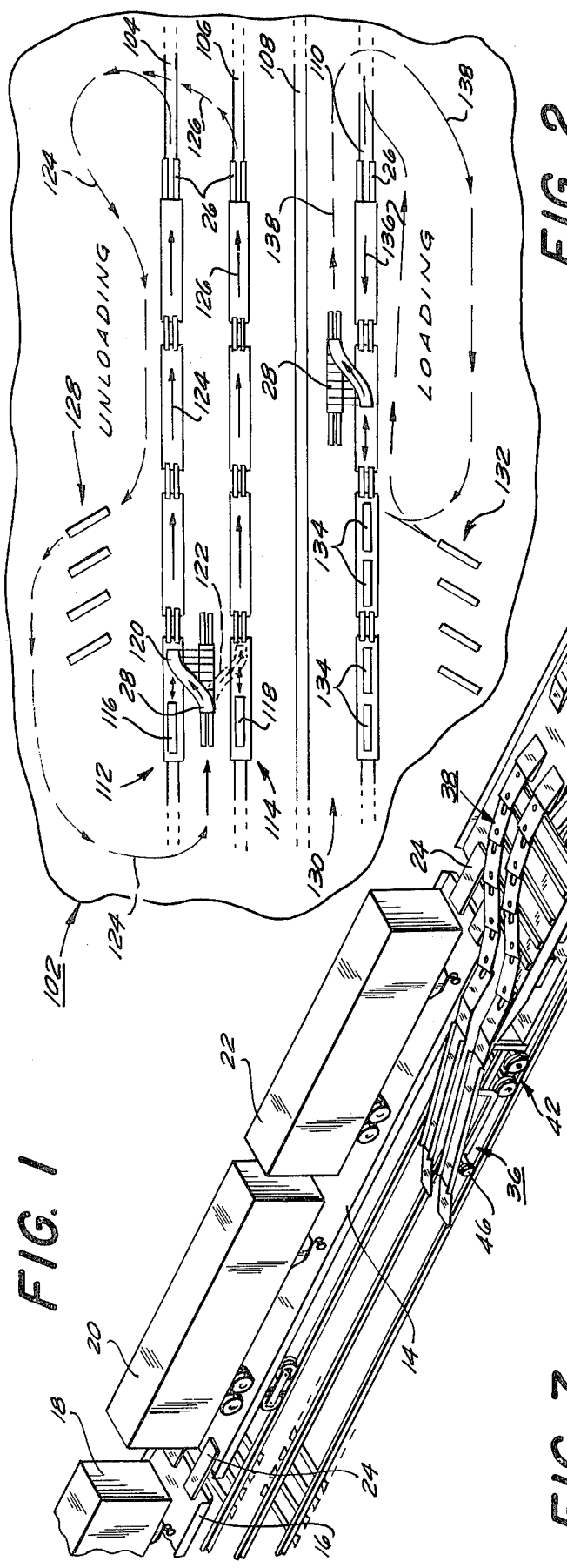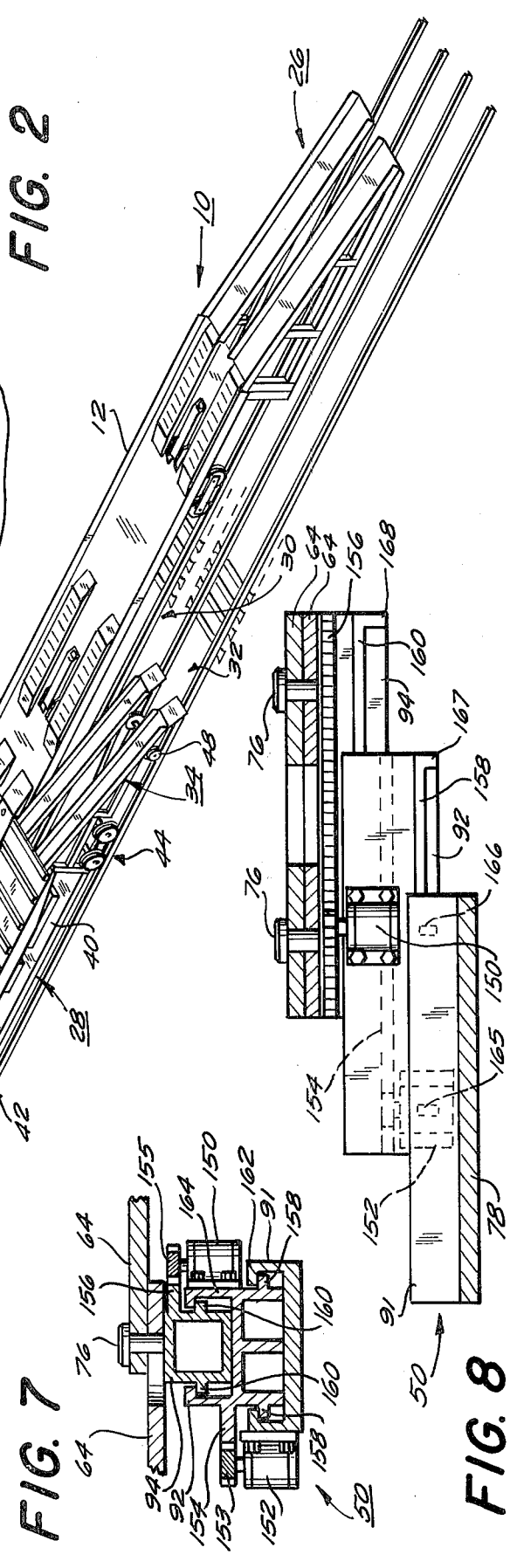

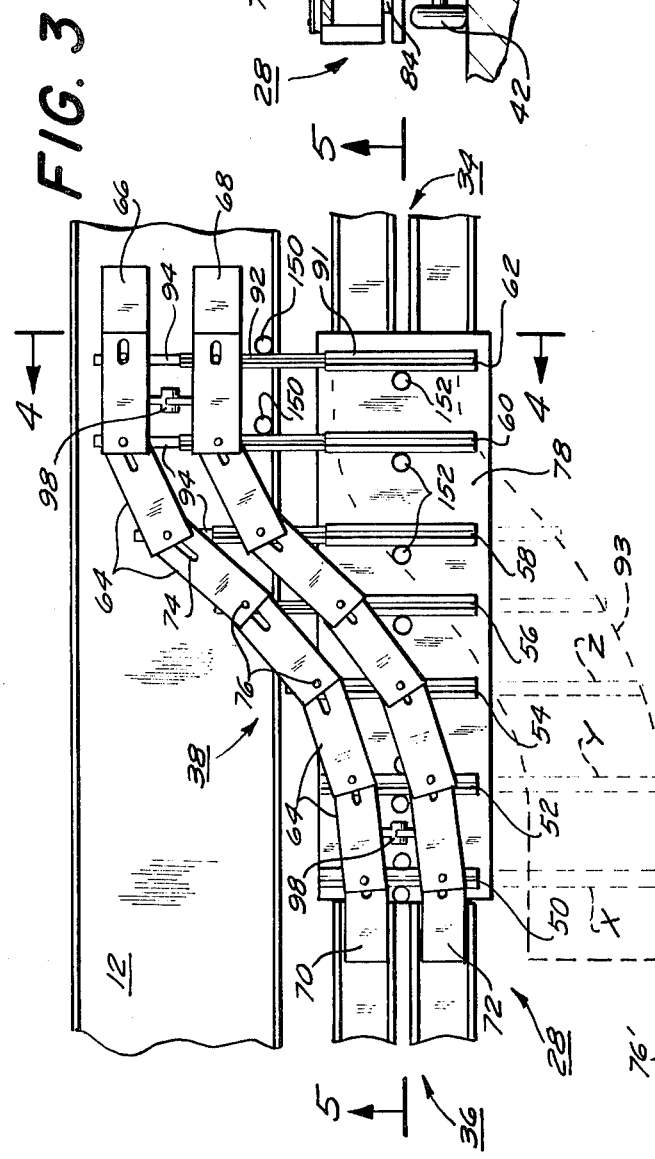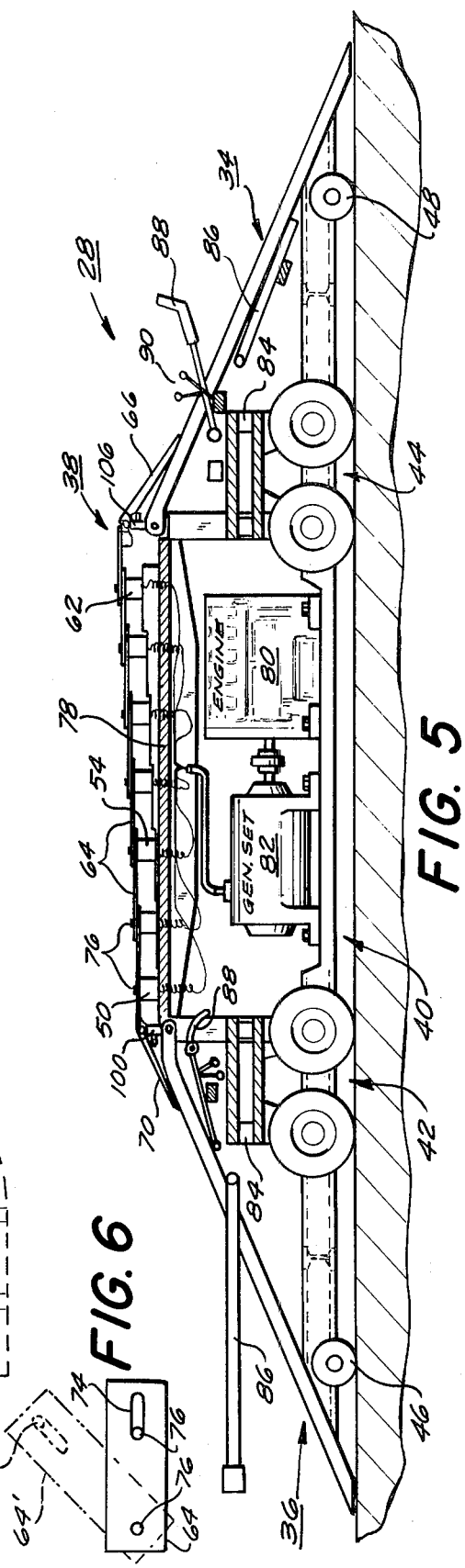

WHEELED RAMP LOADING AND UNLOADING APPARATUS

This invention relates to the loading and unloading of wheeled vehicles, and particularly to the loading and unloading of trailers to and from railroad flatcars.

Many methods have been proposed in the past for loading and unloading wheeled vehicles from railroad flatcars. The four principal methods now used include the "straddle crane" method, in which a large crane straddles the train and lifts the trailers to move them to and from the train. A second method is the "swing crane" method which is the same except that the crane is located at the side of the train instead of straddling it. A third method is the "side slide" method in which a special turntable mechanism is mounted on the flatcar, the trailers are slid onto the turntable mechanism, and the turntable is rotated until the trailer is properly positioned on the flatcar. The fourth method is the "circus ramp" method in which an end ramp is positioned at the end of the train, and tractors travel longitudinally along the train on top of the flatcar beds and up and down the end ramp to load and unload the trailers in serial fashion.

Although the two crane methods have certain advantages, they have serious disadvantages, in that the cranes must be very large and expensive, and require large amounts of valuable land for maneuvering. A further disadvantage is that many trailers suffer damage from being lifted by cranes because they are not structurally built to withstand the stresses of such handling. The side-slide methods require expensive modified flatcar designs, which also increases significantly the capital cost and land use requirements. The circus methods is low in capital cost and land use requirements, but suffers the disadvantage that it is relatively slow.

In accordance with the foregoing, it is an object of the present invention to provide an improved loading and unloading system and method which is very fast and yet has only moderate or low capital cost and land use requirements. It is another object of the invention to provide a low-cost and efficient apparatus for use in the system and method of the invention.

In accordance with the present invention, the foregoing objects are met by the provision of a system and method in which tractor-trailer combinations are loaded and unloaded to and from the flatcars by means of a ramp at one end of the train, and the tractors are loaded to and from the train at the side of the train. With this system and method, the vehicles move in a re-entrant path which includes the tops of the railroad cars, a ramp at one end of the train, a return path on the ground, and a ramp structure at the side of the train. By moving the tractors to and from the train by means of the ramp at the side of the train, the empty or "light" tractors return on the ground, not along the tops of the flatcars, thus freeing the tops of the flatcars for use in loading and unloading trailers. This permits several tractors to load and unload trailers in rapid sequence, thus greatly increasing the speed of the operation as compared with the prior "circus" technique, but at a capital cost and land use cost considerably lower than with other techniques.

The foregoing and other objects and advantages of the invention will be described in or apparent from the following description and drawings.

In the drawings:

FIG. 1 is a perspective, partially schematic view illustrating the system, device and method of the present invention;

FIG. 2 is a schematic diagram illustrating the operation of the invention;

FIG. 3 is a plan view of a portion of the device shown in FIG. 1;

FIG. 4 is an end elevation view of the device shown in FIG. 3;

FIG. 5 is a side elevation view, partially in cross-section, of the movable ramp device shown in FIGS. 1, 3 and 4;

FIG. 6 is a partially schematic view of a component of the device shown in FIGS. 1 and 3 through 5;

FIG. 7 is an enlarged cross-sectional view of a portion of the structure of FIG. 5; and FIG. 8 is a side elevation view of the structure shown in FIG. 7.

GENERAL DESCRIPTION

FIG. 1 shows a loading and unloading system 10 constructed in accordance with the present invention. It is shown in use in unloading trailers 18, 20 and 22 from a train having flatcars 12, 14 and 16. The train is on railroad tracks 30. Only a portion of the train is shown in order to preserve the clarity of the drawings. The flatcar 12 is empty because trailers already have been removed from it.

As in the usual "circus" technique, bridge plates 24 have been lowered to form two tracks bridging the ends of adjacent flatcars so as to form a roadway along the joined beds of the flatcars, and a ramp 26 is located at the end of the train.

In the usual "circus" unloading technique, a tractor (such as an ordinary diesel tractor for hauling semi-trailers on the open highway) backs up the ramp 26 and along the tops of the empty flatcars until it reaches the first trailer 22 on the train. Then it hitches up to the trailer, hauls it along the beds of the flatcars, off of the ramp 26 to a storage area. The tractor then returns to the ramp to get another trailer.

The "circus" loading operation is substantially the reverse; a tractor-trailer combination is backed up the ramp 26 and along the connected beds of the flatcars until it is in proper position, in which the trailer is unhitched and left. The tractor then drives back along the tops of the flat cars and down the ramp 26 to get another trailer to be loaded.

The "circus" technique is slow. However, compared to most of the other prior techniques, it requires relatively little capital investment, because the cost of the ramp 26 and the tractor is relatively low. Furthermore, it does not require much land, and this is an important advantage over the crane and side-slide methods.

In accordance with the present invention a movable ramp structure 28 is provided along side of the train.

The ramp structure 28 includes a frame 40, pairs of wheels 42, 44, 46 and 48, a pair of ramps 34 and 36, and an extensible roadway assembly 38 which forms a bridge between the top of the ramps and a flatcar. The movable roadway 38 is shown in FIG. 1 in position to guide a tractor from ramp 36 onto the flatcar 12, with the tractor facing in the direction of the end ramp 26. Then, the roadway 38 is shifted out of the way so that it does not overhang the flatcar 12 and is not in the way of the tractor, and the ramp structure 28 starts moving to a position for unloading the next trailer.

The tractor on the flatcar 12 is backed up and hitched onto the trailer 22. Then the tractor-trailer combination is driven along the flatcar 12, off the ramp 26 to a holding area, where the trailer is unhitched and left. The tractor then circles back around the train and returns to the movable ramp structure 28.

Meanwhile, as soon as the first tractor-trailer combination has moved out of the way, and the ramp structure is in position, the extensible roadway 38 is extended again to a position in which it forms a bridge to the flatcar 14, at a location just ahead of the next trailer 20 to be unloaded. A second tractor then is driven onto the flatcar 14 over the ramp 36 and the roadway 38. The roadway 38 then is retracted, and moved to the next position while the second tractor repeats the unloading operation performed by the first tractor. Meanwhile, a third tractor is ready to perform the same unloading functions for the next trailer, and so on.

In the foregoing procedure, the tractors do not have to wait until the previous trailer has been removed from the train before they mount the train to hitch onto the next tractor. This greatly improves the speed of unloading as compared with the "circus" technique. In effect, each of the tractors uses the tops of the cars as a road only when pulling a trailer, and travels on the ground when returning to get another trailer, thus freeing the car-top road for subsequent trailers to use.

In the loading operation, the procedure is substantially reversed. Tractors hauling trailers to be loaded are backed up the ramp 26 at the end of the train, and are backed along the tops of the cars until they are in proper position, where the trailers are unhooked and secured in place. The tractor then leaves the train via the movable ramp structure 28. However, the movable roadway 38 is shifted so that its left end rather than its right end contacts the surface of one of the flatcars, and the other end connects with the right-hand ramp 34 so that the vehicle exits in a direction towards the end ramp 26.

Again, as in the case of the unloading operation, a return path on the ground is provided for the tractors so that other tractors may mount the train with their loads and load them while the previous tractor is delivering its load and returning for another.

RAIL YARD SYSTEM

FIG. 2 shows a rail yard system 102 including a plurality of parallel tracks 104, 106, 108 and 110. The space between adjacent tracks such as tracks 104 and 106 preferably is twice what it normally is so that there will be adequate room in which to maneuver the ramp structure 28. However, if a railroad track happens to be located between the adjacent tracks 104 and 106, as is the track 32 in FIG. 1, then it can be used as a track for the ramp structure 28. The wheels 42, 44, 46 and 48 in FIG. 1 are flanged railroad wheels enabling the vehicle to move on the track 32. The spaces between and on both sides of the rails 32 are filled so as to provide a level surface on which the tractors can roll.

Referring again to FIG. 2, two trains 112 and 114 are shown on the tracks 104 and 106, respectively. In order to illustrate a particularly advantageous feature of the invention, the two trains 112 and 114 are shown with trailers 116 and 118 on flatcars, with all of the trailers facing in the same direction, namely, the direction towards the end ramps 26.

A movable ramp unit 28 is provided between the two trains 112 and 114. In use in unloading trailers 116 and 118, the movable roadway 38 first extends to a position 120 over the first train 112 until a tractor has mounted the ramp and is on the train, and then, without moving the ramp structure 28, the roadway 38 is shifted to a position 122 over the other train 114 so that the next tractor may mount that train. Then, the movable ramp unit 28 is moved to the next position for the removal of successive trailers (not shown), and the process is repeated. Thus, the movable ramp unit 28 can be used, in a single location, to assist in unloading trailers from two trains simultaneously. This greatly increases the productivity of the system and speeds the unloading of the trains.

During the unloading procedure, tractor-trailer combinations travel along the top of the train 112 along a re-entrant path 124. They exit via the end ramp 26, swing around and drop the trailer in a storage area 128, and continue along the path 124 back to the ramp unit 28. Thus, each truck follows a re-entrant or circular path in which the return portion for the tractor is on the ground instead of on top of the train.

A similar path 126 is followed by tractor-trailer combinations along the top of the train 114 and off the end ramp 26 towards the unloading area 128, and back to the movable ramp unit 28.

A single movable ramp unit 28 also can be used to simultaneously load two parallel trains whose trailers face in the same direction. another movable ramp unit 28 is shown in use in loading trailers 134 on a single train 130. The tractor-trailer combinations follow a path 136. Each tractor-trailer backs up the ramp 26 and moves along the tops of the flatcars until the trailer is in a desired position, in which it is unhitched and secured. The tractor then proceeds off of the train by means of the ramp unit 28, and travels a return path 138 to the loading area 132 where it picks up another load to be placed on the train. The loading operation, like the unloading operation, can be performed on two adjacent trains for maximum productivity.

Although the loading and unloading techniques of the present invention require slightly more space than the conventional circus technique, that extra space is much less than the extra space needed for the other techniques such as those using cranes. Moreover, the present technique is much faster than the "circus" technique, and is as fast as or faster than the usual crane techniques. Since the present method is faster than the ordinary "circus" technique, it enables one to reach and unload a particular desired trailer much faster than with the "circus" technique. Since land in urban areas is very expensive, and since large cranes and the other equipment used in prior techniques is very expensive to buy and maintain, the advantages provided by the invention are significant.

The invention puts less stress on the trailers than cranes do. Therefore, the invention has the further advantage that it reduces repairs and maintenance for the trailers.

As compared with the side-lift techniques, there is a significant capital expenditure advantage to the invention in that it requires no changes to either exiting trailer fleets or railroad flatcar fleets.

The tractors used in practicing this invention can be ordinary tractor-trailer tractors as used on the open highway. In fact, since the duty requirements are less severe than on the open highway, the tractors can be used or of an older vintage so that they can be obtained at a relatively low cost.

MOVABLE RAMP UNIT — DETAILED DESCRIPTION

Referring now to FIG. 3, the extensible roadway 38 at the top of the movable ramp unit 28 includes a plurality of telescopic support members 50, 52, 54, 56, 58, 60 and 62. Each of the telescopic members includes an innermost member 94, a slotted intermediate member 92, and a slotted outer member 91 which is secured to the top plate 78 of the ramp unit. Secured to each inner arm 94 are two upright pivot pins 76 which extend through the slots in the members 91 and 92 when the arm 94 is retracted fully inside of the other two members.

Slotted plates 64 are slidably mounted on the pivot pins 76 so as to form two tracks on which the tractor wheels can travel. As it is shown in FIG. 6, each of the plates 64 has a slot 74 whose length is such that the pins 76 is near the innermost end of the slot when the plate is in the horizontal position shown in FIG. 6, and, when the right hand pivot pin 76 is moved vertically to the position 76' shown in FIG. 6, the pin 76 is at the outermost end of the slot 74. The other pin 76 at the opposite end of the plate 64 is pivotably mounted through a hole in the plate 64.

Referring again to FIG. 3, the ends of the plates 64 overlap one another by a substantial amount so that when the telescopic arms 94 are extended outwardly, the plates 64 still will overlap one another to form a continuous, solid surface for the tires of the tractors.

It is to be noted that the telescoping arms can be extended symmetrically in either direction so that the arms can be extended over and beyond either side of the ramp unit 28. Therefore, ramps facing in any one of four different directions can be formed by different combinations of the arms. As an example, in FIG. 3 the dashed outline 93 indicates a roadway formed by shifting each of the telescopic members downwardly as shown in FIG. 3. The positions of a few of the telescopic arms are indicated at X, Y and Z as examples of the positions the arms would take in supporting the movable roadway in the new position 93.

By reversing the order in which the telescopic members are retracted or extended, roadways facing in the opposite direction can be formed. For example, with member 62 fully withdrawn, and member 50 fully extended over the flatcar 12 shown in FIG. 3, a roadway using the ramp 34 instead of the ramp 36 as the exit or entrance would be provided. Similalry, with member 62 extended fully in the direction opposite to that shown in FIG. 3, and member 50 withdrawn as shown in FIG. 3, a roadway on the opposite side and facing in the opposite direction can be formed.

The distance of extension of each of the telescoping members can be pre-determined in order to form one of the four different roadway shapes. Thus, merely by operating a single control, the operator can extend or retract each of the telescopic members to the extent necessary to form the desired roadway.

Referring now to FIG. 4 as well as FIG. 3, it is seen that the movable roadway 38 is high enough so that it is above the top of the flatcar 12. Since the heights of flatcars vary somewhat, the height of the unit 28 is made adjustable by means of hydraulic lifts 84 (also see FIG. 5).

As a support for the telescopic arms and plates in their outermost position, support structures 96 are caused to drop into place by hydraulic control means, and then are retracted when the roadway is retracted. Each support structure 96 has a foot portion 98 which drops against the deck of the flatcar to provide a solid support for the roadway while it is extended over the flatcar. Additional support structures 96 can be provided for plates 64 other than the two end plates as shown in FIG. 3, to the extent that additional support is necessary. The details of the system used to drop and retract the support structure 96 are not disclosed in detail herein since their provision is well within the skill of the art.

FIGS. 7 and 8 show the details of one telescoping arm mechanism 50. The outer member 91 is channel-shaped and has upper inwardly-extending flanges 162. A gear motor 152 is attached at approximately the center (see FIG. 8) of member 91 and drives a pinion gear 153. Gear 153 drives a rack 154 secured to the outside of the second telescoping member 92.

The second telescoping member 92 has an upper flange 164 and a longitudinal spline 158. The spline 158 fits under the flange 162 to keep the telescopic members together when extended. A second gear motor 15 is secured at the center of the member 92 and drives a pinion gear 155 which drives a rack 156 on the innermost member 94.

The innermost member 94 has a longitudinal spline 160 which fits under flange 164 to keep the telescopic members aligned with one another.

In FIG. 8 the telescopic members 91, 92 and 94 are shown fully extended. The maximum distance each arm extends is less than half of its length so that the gears 153 and 155 never leave the racks 154 and 156. Stops 165 and and 166 positioned in the centers of sections 91 and 92 cooperate with tabs 167, 168 at each end of members 92 and 94 to limit the extension of the telescopic members. The gearmotors 150 and 152 are driven in one direction to extend the arms as shown in FIG. 8, and in the opposite direction to retract the arms or extend them in the opposite direction.

The motors are electrical, but they can be hydraulic if desired. Hydraulically-operated telescoping arms also can be used instead of the rack-and-pinion drive shown in the drawings.

Referring to FIGS. 3 and 5, hinged end plates 66, 68, 70 and 72 are provided for the movable roadway 38. Hydraulic piston actuating devices 100 (FIG. 5) are provided to lift and drop the plates 66, 68, 70 and 72. The plates are lifted, of course, when the roadway 38 is moving, and are dropped again when the roadway has reached its desired position.

As it is seen in FIG. 3, the plates 66 and 68 drop down to the floor of the flatcar to provide transition ramps to ease the descent of the tractor onto the flatcar. The same members 66 and 68, when in alignment with the tracks on the ramp 34, as shown in FIG. 5, serve as transition members for the ramp 34. The plates 70 and 72 are operated and actuated in the same manner as the member 66 and 68, and serve the same functions at the other end 36 of the movable ramp unit.

Referring to FIG. 5, the preferred propulsion system for the movable ramp device 28 includes an engine 80 driving wheels 44 through a conventional transmission (not shown). The version of the ramp device 28 shown in FIGS. 4 and 5 uses wheels with inflated rubber tires instead of the flanged railroad wheels shown in FIG. 1. A conventional steering system (not shown) is provided for the wheels 42, and a mechanism (not shown) for lifting the wheels 46 and 48 during travel in which any significant degree of steering is required is provided. However, rather than a steering system, it is preferred that a guide rail be erected alongside of the track 30 to guide the device 28 in its travel, or that railroad tracks 32 such as those shown in FIG. 1 be used to guide the vehicle 28.

Two retractable seats 88 are positioned in the space between the two tracks of the ramps 34 and 36. One of the seats 88 is lifted into operative position when it is desired to move the vehicle in one direction, and the other seat is lifted into position when it is desired to move the vehicle in the opposite direction. Control levers 90 are provided to control the retraction and extension of the telescoping members to form the movable roadway 38, and to move the unit 28 to a new desired position A motor-generator set 82 is driven by the engine 80 and supplies electrical power to operate the telescoping arms, and the motors of the hydraulic lifts 84 and devices 100.

If tipping of the unit 28 should be a problem, this can be solved by providing a shifting counter-weight within the body of the unit 28 which shifts from side to side to counterbalance the weight of the overhanging roadway 38 until the support structure 96 has been lowered to the deck or other superstructure of the flatcar.

As an alternative means of propulsion, the device 28 can be pushed or pulled. During operation of the unit 28 in loading or unloading trailers, retracting yokes or tounges 86 are provided so that a tractor can push or pull the unit 28. If desired, the engine or tractor and its hydraulic and/or electrical system can be connected to the operative system of the unit 28 so that the engine 80 and the unit 82 will not be needed. Controls then would be operated from the cab of the tractor.

If the ramps 34 and 36 must be lifted above the ground sufficiently to cause a large gap between the lower edges of the ramps 34 and 36 and the ground, hinged plates can be provided at the bottoms of the ramps like the plates 66, 68, 70 and 72 in order to smooth the transition of the tractor from the ground to the ramp (See FIG. 1).

VARIATIONS

The above description of the invention is intended to be illustrative and not limiting. Various changes or modifications in the embodiments described may occur to those skilled in the art and these can be made without departing from the spirit or scope of the invention.

For example, the ramp unit 28 can be used to load and unload wheeled vehicles other than tractor-trailer tractors. For example, farm tractors, autos, relatively short fixed-body trucks, and other self-propelled vehicles can be loaded and unloaded on the train by means of the device 28.

Under certain circumstances where it is practical to make the movable ramp unit 28 relatively long and strong, it is possible to load and unload complete trailer-tractor combinations by means of the movable ramp unit 28. However, it is deemed preferable to use the unit 28 to load only relatively light vehicles such as tractors because this keeps the size and cost of the unit 28 considerably below what it would have to be to support the much greater weight and length of the fully-loaded trailers.

In another variation of the invention, light-duty cranes or other known loading devices can be used instead of unit 28 for loading and unloading tractors from the flatcars at the side of the train.

In unloading trailers, it is possible to back the tractors up the ramp unit and onto the train instead of driving the tractors up the ramp frontwards. The extensible roadway 38 then must be extended so that the tractors will be moving towards the trailers on the train instead of away from the trailers as shown in FIG. 1. The tractors then do not have to back up as far while on the train, and do not have to wait for retraction of the roadway 38 before hitching onto the trailers. The time needed to retract the roadway 38 thus can be used advantageously so that the unloading operation is further accelerated.

The extensible roadway 38 also can take various forms different from the one specifically disclosed. For example, instead of multiple hinged plates 64, it is possible to use a single large rectangular plate extendable on telescoping arms in both directions perpendicular to the longitudinal axis of the unit 28. It also is possible to use a hinged drawbridge structure which would be lifted and lowered instead of extending and retracting. Other variations in the structure can be made without departing from the spirit of the invention.

I claim:

1. A ramp device for guiding vehicles to and from laterally adjacent cars of a railroad train, said ramp device comprising a body, ramp means for guiding said vehicles between the ground and the tops of said cars, said ramp means extending up from the ground in a first direction and further forming bridge means having a portion extending laterally over a side of said body and adapted to extend over a side of a railway car in a second direction transverse to said first direction, said laterally extending portion of said bridge means providing continuous means for enabling said vehicles to move onto said cars of said train in a direction longitudinal of said cars.

2. A device as in claim 1 in which said ramp means includes means for extending and retracting said bridge means, and means for movably supporting said ramp means on the ground so as to be movable in said first direction substantially parallel to said cars of said railroad train.

3. A device as in claim 1 in which said bridge means includes means for forming a generally S-shaped roadway for enabling vehicles to move successively in said first, said second, and again in said first directions when traveling between said cars and said ramp means.

4. A device as in claim 1 in which said ramp means includes a pair of opposed ramps to receive and deliver vehicles from two opposite directions, and means for selectively connecting said bridge to said ramps.

5. A device as in claim 1 including means for lowering and raising said bridge means relative to said cars.

6. A device as in claim 1 in which said bridge means has an innermost end adjacent said body and an outermost and extending outwardly from said body and includes support means adjacent said outermost end extensible downwardly and retractable upwardly for supporting said outermost end of said bridge means on said cars.

7. A device as in claim 6 including additional ramp means at said outermost end for guiding the descent from and ascent to said bridge means by said vehicles when said bridge means is above the tops of said cars.

8. A ramp device for guiding vehicles to and from cars of a railroad train, said ramp device comprising a body, a ramp means for guiding vehicles between the ground and the tops of said cars, said ramp means extending up from the group and forming an extensible and retractable bridge section over one side of said body, said extensible and retractable bridge section forming a reverse curve section between the parallel path formed by the ramp means from the ground to the tops of the flat cars to effect delivery of the cars longitudinally of the cars of the train, said bridge section comprising at least one transversely extensible arm mounted on said body to extend and retract towards and away from a railroad car at the side of said body, at least one plate pivotably connected adjacent one end to said arm, and means for extending and retracting said arm.

9. A device as in claim 8 in which said extensible arm has a plurality of telescopic sections, and drive means for extending and retracting said sections relative to one another in two opposite directions, and means for limiting the extension of said sections relative to one another to one half length of one of said sections.

10. A device as in claim 8 including a plurality of said extensible arms and plates, each plate being pivotably connected between two adjacent ones of said arms, each plate having an elongated longitudinal slot at one end thereof, a pivot member on each of said arms, each plate overlapping a plate on the adjacent arm, and having a pivot member of one arm extending through said slot, and the pivot member of the other arm pivotably connected to the plate adjacent the other end of said plate.

11. A device as in claim 8 including means for mounting said arm to extend away from both sides of said body to form bridges to cars on both sides of said ramp device.

12. A retractable and extensible bridge structure for guiding wheeled vehicles onto and off of the tops of railroad cars from a support structure at an elevation adjacent the tops of said railroad cars, said bridge structure comprising means forming a first roadway portion extending transversely of said support structure and said railroad cars and extending over a major portion of the width of said cars, and a second portion extending longitudinally of said cars to enable said wheeled vehicles to turn on said roadway and move onto said cars in a longitudinal direction, and means on said support structure for retracting said bridge structure away from said cars and extending said bridge structure outwardly to a position overlying said railroad cars.

13. A device as in claim 12 including a plurality of pivotably-interconnected plates joined end-to-end to form said roadway, a plurality of telescopic arms mounted on said support structure and pivotably connected to said plates to push and pull them transversely to form and retract said roadway.

14. A device as in claim 12 including means for supporting said roadway structure above the upper surfaces of said cars, and transition means secured to said roadway structure and comprising a ramp for guiding said vehicles upwardly onto and downwardly off of said roadway structure when traveling between said roadway structure and said cars.

* * * * *